(12) United States Patent
Vaidya

(10) Patent No.: US 11,782,029 B2
(45) Date of Patent: Oct. 10, 2023

(54) DEVICE AND SYSTEM FOR MONITORING WEAR OF A WEARABLE COMPONENT MOUNTED IN MINING EQUIPMENT

(71) Applicant: Viwek Vaidya, Beaconsfield (CA)

(72) Inventor: Viwek Vaidya, Beaconsfield (CA)

( * ) Notice: Subject to any disclaimer, the term of this patent is extended or adjusted under 35 U.S.C. 154(b) by 489 days.

(21) Appl. No.: 17/109,489

(22) Filed: Dec. 2, 2020

(65) Prior Publication Data
US 2021/0132006 A1 May 6, 2021

Related U.S. Application Data

(63) Continuation of application No. PCT/CA2019/051789, filed on Dec. 11, 2019.
(Continued)

(51) Int. Cl.
*G01N 29/07* (2006.01)
*B02C 25/00* (2006.01)
*G01N 29/22* (2006.01)

(52) U.S. Cl.
CPC ............. *G01N 29/07* (2013.01); *B02C 25/00* (2013.01); *G01N 29/223* (2013.01); *G01N 2291/011* (2013.01); *G01N 2291/02854* (2013.01)

(58) Field of Classification Search
CPC ...... G01N 29/07; G01N 29/223; G01N 29/14; G01N 29/2412; G01N 2291/0258; G01N 2291/02854; G01N 2291/044; G01N 2291/011; G01N 2291/2691; B02C 25/00; B02C 17/1805; B02C 17/1825; B02C 23/00; B02C 2210/01
(Continued)

(56) References Cited

U.S. PATENT DOCUMENTS

| 1,772,026 A | 8/1930 | Bartley |
| 3,314,618 A | 4/1967 | McDonald |

(Continued)

FOREIGN PATENT DOCUMENTS

| CA | 1135672 A | 11/1982 |
| CA | 2632548 A1 | 6/2007 |

(Continued)

OTHER PUBLICATIONS

KnowledgeScape GrindingExpert, Jul. 31, 2014, Brochure, 6 pages.
(Continued)

*Primary Examiner* — Jacques M Saint Surin
(74) *Attorney, Agent, or Firm* — BCF LLP

(57) ABSTRACT

A device and a system monitor wear of wearable components mounted in a mining equipment. An elongated bolt maintains a wearable component in place on a face of the equipment. A threaded section of the bolt terminates at a proximal end protruding externally through a hole of the equipment. A shank of the bolt terminates at a distal end opposite from the proximal end. The shank extends along a thickness of the wearable component and wears as the wearable component wears when the equipment is in operation. A transducer coupled to the proximal end of the bolt generates a sound wave within the bolt, detects an echo of the sound wave reflected by the distal end of the bolt, and reports to a controller a time delay between the sound wave and the echo. The controller evaluates a wear of the wearable component based on the time delay.

20 Claims, 16 Drawing Sheets

Related U.S. Application Data

(60) Provisional application No. 62/917,661, filed on Dec. 26, 2018.

(58) Field of Classification Search
USPC .......................................................... 73/598
See application file for complete search history.

(56) References Cited

U.S. PATENT DOCUMENTS

| | | | |
|---|---|---|---|
| 3,554,013 A | 1/1971 | Berg | |
| 3,582,007 A | 6/1971 | Heighberger | |
| 4,382,253 A | 5/1983 | Belthle | |
| 4,402,465 A | 9/1983 | Persson et al. | |
| 4,510,793 A | 4/1985 | Ploegaert et al. | |
| 4,655,077 A | 4/1987 | Purvis et al. | |
| 4,884,434 A | 12/1989 | Satake et al. | |
| 4,945,770 A | 8/1990 | Alvelid et al. | |
| 5,176,053 A | 1/1993 | Alvelid et al. | |
| 5,544,819 A | 8/1996 | Shepherd | |
| 5,896,429 A | 4/1999 | Lanza et al. | |
| 6,208,128 B1 | 3/2001 | Braconnier et al. | |
| 6,366,201 B1 | 4/2002 | Hanisko | |
| 6,386,237 B1 | 5/2002 | Chevalier et al. | |
| 6,471,449 B1 | 10/2002 | Kataoka | |
| 6,510,729 B2 | 1/2003 | Bonnevie et al. | |
| 7,172,144 B1 | 2/2007 | Slater et al. | |
| 7,591,437 B2 * | 9/2009 | Nilsson | B02C 2/047 241/34 |
| 7,677,079 B2 | 3/2010 | Radziszewski et al. | |
| 7,748,521 B2 | 7/2010 | Aizawa et al. | |
| 8,384,266 B2 | 2/2013 | Fish et al. | |
| 8,570,030 B2 | 10/2013 | Morton | |
| 9,360,309 B2 | 6/2016 | Sullivan et al. | |
| 9,476,689 B2 | 10/2016 | Steed et al. | |
| 9,527,087 B2 | 12/2016 | Magne et al. | |
| 9,724,697 B2 | 8/2017 | Steed et al. | |
| 9,849,460 B2 | 12/2017 | Sepulveda et al. | |
| 9,903,909 B2 | 2/2018 | Hammer et al. | |
| 10,113,855 B2 | 10/2018 | Ledoux et al. | |
| 10,710,088 B2 * | 7/2020 | Salonen | B02C 25/00 |
| 2011/0037983 A1 | 2/2011 | Davies | |
| 2013/0026263 A1 | 1/2013 | Bamber et al. | |
| 2019/0203599 A1 | 7/2019 | Sun et al. | |
| 2020/0209128 A1 * | 7/2020 | Bustos Robledo | G01B 17/02 |

FOREIGN PATENT DOCUMENTS

| | | |
|---|---|---|
| CA | 3075171 A1 | 3/2019 |
| CL | 2017-002263 A1 | 2/2018 |
| CN | 205797379 U | 12/2016 |
| GB | 2232492 A | 12/1990 |
| WO | 2017004565 A1 | 1/2017 |
| WO | 2017101319 A1 | 6/2017 |
| WO | 2019046984 A1 | 3/2019 |

OTHER PUBLICATIONS

PAX, The measurement of comminution processes in tumbling mills, Feature-Comminution, Bulletin Magazine, Jun. 2017, pp. 68-71.
Kaltech, The Ibolt, Retrieved from site www.Kaltechglobal.net on Dec. 4, 2019.
High Service Technology, Sensor de Degaste para Revestimientos y Placas, Jul. 2017, 11 pages.
Meija et al., Maintaining Grinding Efficiency and Mill Throughput when Liners Wear, 51st Canadian Mineral Processors conference, Jan. 22-24, 2019pp. 248-260.
High Service Technology, SWS Smart Wear Sensor for Mill Liners and Wear Plates, Brochure, 4 pages.
High Service Corp, Smart Wear Sensor System, retrieved from https://www.highservice.com/en/highservice-technology-eng/sws-smart-wear-sensor-system/ Retrived on Dec. 3, 2019, 4 pages.
Remote Emat Enclosure, 1 page.
Quenneville, Ground-Breaking Development in Rock Bolt Sensor (RBStm)Technology, NRC-CNRC, 23 pages.
International Search Report of corresponding application No. PCT/CA/2019/051789, dated Feb. 13, 2020.
Quenneville, Y., Ground-Breaking Development in Rock Bolt Sensor (RBS) Technology, National Research Council of Canada, May 8, 2018.
Permasense, "Optimizing Plant Integrity through Continuous Wall Thickness Monitoring", Published on Oct. 30, 2018, 24 pages.

* cited by examiner

DEVICE AND SYSTEM FOR MONITORING WEAR OF A WEARABLE COMPONENT MOUNTED IN MINING EQUIPMENT

CROSS-REFERENCE

The present application is a continuation of International Patent Application No. PCT/CA2019/051789, filed on Dec. 11, 2019, which claims priority to U.S. Provisional Patent Application No. 62/917,661, filed on Dec. 26, 2018, the entirety of both of which is incorporated herein by reference.

TECHNICAL FIELD

The present disclosure relates to the field of non destructive testing. More specifically, the present disclosure relates to a device and a system for monitoring wear of a wearable component mounted in mining equipment.

BACKGROUND

Mineral crushers, such as autonomous grinding (AG) mills, semi-autogenous grinding (SAG) mills and other types of mills, are commonly used in mining and other industries to grind and crush ore material. The material to be crushed is introduced in a generally cylindrical, rotating drum having on its internal faces a number of lifters, which are usually made of steel or rubber. FIG. 1 (prior art) is a side elevation view of a SAG mill. Material to be crushed is inserted in a SAG mill 10 via a feed end 12 and reaches an internal cavity of a rotating drum 14. A motor and drive combination 16 causes the rotating drum 14 to rotate. A number of lifters, which are usually made of rubber as described below, are disposed along the internal periphery of the rotating drum 14. As the rotating drum 14 rotates, pieces of the material and grinding media, such as steel balls, contained in the rotating drum 14 tumble over the lifters and collide with each other, breaking into smaller pieces. The material eventually exits from the rotating drum 14 at a discharge end 18 of the SAG mill 10.

FIGS. 2a and 2b (prior art) are cross-sectional side views of a first and second variant of lifters mounted in the rotating drum of the SAG mill. Lifters 20a or hybrid lifters 20b (generally referred to as lifters 20 in the present disclosure) are mounted on the internal faces of the cavity of the rotating drum 14, on a steel shell 22 of the SAG mill 10. Lifters 20 may be present on an internal sloped face extending from the feed end 12 of the SAG mill 10 to a main cylindrical section of the rotating drum 14, on an internal face of this main cylindrical section, and on an internal sloped face extending from the main cylindrical section to the discharge end 18 of the SAG mill 10. The lifters 20 are usually made of steel or rubber. The hybrid lifters 20b further comprise vulcanized steel inserts 24 on a leading face thereof for improved performance and durability. Although not shown on FIGS. 2a and 2b, the lifters 20 have a length that extends substantially along an internal length of the rotating drum 14. The lifters 20 are held in place within the rotating drum 14 by use of bolts 26 disposed along the length of the lifters 20.

For installing a lifter 20 in the SAG mill 10, a head of the bolt 26 is slid into a steel channel 28 to line up with a corresponding hole 30 in the steel shell 22. An aluminum extrusion 32 is vulcanized into the rubber material of the lifter 20. The aluminum extrusion 32 is shaped to prevent the detachment of the lifter 20. The lifter 20 is held in place by mounting a cup washer 34 around a tip of the bolt 26 on an external face of the steel shell 22 and by tightening a nut 36 on the tip of the bolt 26. Additional components used to maintain the lifter 20 in place include a support 38 placed underneath the aluminum extrusion 32, a rubber gasket 40 extending on the internal face of the cavity of the rotating drum 14, and rubber packing 42 disposed between each adjacent lifter 20.

Some mill operators prefer to change some of lifters 20 mounted in their SAG mills 10 in a given maintenance operation, for example changing half the their used lifters 20 so that new and old lifters 20 alternate side-by-side within the drum 14. FIG. 3 (prior art) is a cross-sectional view of adjacent lifters mounted in the rotating drum of the SAG mill. FIG. 3 shows an optional configuration in which tall lifters 20t alternate with short lifters 20s. The tall lifters 20t are newer lifters and the short lifters 20s are partially worn lifters. This configuration of alternating tall and short lifters enhances the tumbling movement of the material in the SAG mill 10. Apart from their heights, the tall lifters 20t and the short lifters 20s are similar to the lifters 20a and 20b of FIGS. 2a and 2b and are mounted to the rotating drum 14 in the same fashion.

The lifters 20 (and their variants as described hereinabove) are consumable items that need to be replaced during planned shutdowns of the SAG mill 10. FIG. 4a (prior art) is a perspective view of a number of new lifters. FIG. 4b (prior art) is a perspective view of a number of worn lifters. Lifters 20d shown on FIG. 4a are made of steel and include preformed perforations 46 adapted for insertion of the bolts 26 from the top of the lifters 20d. The lifters 20d are ready to be installed in the SAG mill 10 and do not show any wear. In contrast, the lifters 20d shown on FIG. 4b show significant wear, as shown on area 44 of one lifter 20d, and are ready for disposal. Traditionally, shutdowns have been planned based on historical data for a given construction of the SAG mill 10 and for given characteristics of the ore material crushed in the SAG mill 10.

Downtime of the SAG mill 10 is very expensive and may run into tens of thousands of dollars per hour in loss of production. This use of historical data may be imprecise as erosion rates of the lifters 20 (including any variant such as the lifters 20a, 20b, 20d, 20t or 20s) may vary between the feed end 12 and the discharge end 18 of the SAG mill 10, and may further vary according to the quality of the ore material and other operation conditions of the SAG mill 10. A consequence of this is that the SAG mill 10 may be shutdown at planned intervals when the lifters 20 have not yet reached their useful lifetime.

The SAG mill 10 may be shutdown at regular intervals, for example every 30 to 45 days, to allow a maintenance team to inspect the lifters 20, for example using laser scanning. In addition to the duration of this inspection, typically 30 minutes for a 10-fool mill, several hours are required to analyze results of the inspection. Considerable operating time of the SAG mill 10 is therefore lost.

Various non-destructive techniques have been proposed to facilitate the evaluation of lifter wear in SAG mills without requiring downtime. FIG. 5 (prior art) shows a conventional bolt for mounting a lifter and an extended bolt including a measurement device. FIG. 6 (prior art) is a cross-sectional front view of a lifter supported by traditional and extended bolts. An extended bolt 50 differs from the bolt 26 in that it includes an instrumented shank 52 that is inserted in a corresponding perforation of the lifter 20, for example the perforations 46 of the steel lifters 20d, so that a distal end 54 of the instrumented shank 52 substantially reaches a top 56 of the lifter 20 when the extended bolt 50 and the lifter 20 are new. The distal end 54 of the instrumented shank 52 will wear substantially at the same rate as the top 56 of the lifter 20.

In particular, ultrasonic technology (UT) piezoelectric sensors (not shown) are used to evaluate a distance between what remains of the distal end 54 of the instrumented extension and a point of contact of a piezoelectric sensor placed, for example, at an proximal end 58 of the extended bolt 50. FIG. 7 (prior art) is a side elevation, cross-sectional view of a lifter and of a variant of the extended bolt adapted for ultrasonic technology sensing. An extended bolt 50*a* includes a solid shank 52*a* having a plurality of reference apertures 60 distributed along its length. The extended bolt 50*a* is mounted on a rubber lifter 20 in which plates 48 are used as anchors for the solid shank 52*a*. A UT piezoelectric sensor 62 is placed on a proximal end 58*a* of the extended bolt 50*a*. Ultrasonic waves emitted by the UT piezoelectric sensor 62 are reflected by the reference apertures 60 and captured by the UT piezoelectric sensor 62. One reference aperture 60 has a longer depth 'd' at a distal end 54*a* of the extended bolt 50*a* while other reference apertures 60 have gradually diminishing depths according to their distance from the distal end 54*a* to ensure that the ultrasonic waves can reach reference apertures 60 further from the UT piezoelectric sensor 62 without being blocked by other reference apertures 60 closer to the UT piezoelectric sensor 62. The UT piezoelectric sensor 62 measures a time delay between the emission of an ultrasonic wave and its latest reflection, which is an echo of the ultrasonic wave on a furthest reference aperture 60 that remains on the solid shank 52*a* as the distal end 54*a* gradually becomes worn. The longer the time delay, the longer the remaining length of the solid shank 52*a*. This technology requires the presence of a fluid couplant at the interface between the UT piezoelectric sensor 62 and the proximal end 58*a* of the extended bolt 50*a*. It has been found that such a fluid couplant cannot be viably maintained in a SAG mill 10 operating at high temperatures over many months. Another disadvantage of this technology is that ultrasonic waves are best reflected by elements that are substantially perpendicular to their direction. Hence, the measured time delay may provide an inaccurate indication of the actual wear of the extended bolt 50*a*, and of the lifter 20, when the distal end 54*a* is worn at an angle from a longitudinal axis of the elongated bolt 50*a*.

Resistive and capacitive detection technologies have also been proposed. FIG. 8 (prior art) is a perspective, cross-sectional view of another variant of the extended bolt adapted for capacitive or resistive sensing. As shown on FIG. 8, an extended bolt 50*b* includes an elongated internal channel 64 extending on a longitudinal axis of an instrumented shank 52*b*. An electronic circuit 62 is inserted in the internal channel 64. The nature of the electronic circuit 62 varies depending on whether resistive detection technology or capacitive detection technology is used.

Resistive detection technology requires installing several electrical wires of various lengths within the internal channel 64 of the instrumented shank 52*b* of the extended bolt 50*b*. As the top 56 of the lifter 20 and a distal end 54*b* the instrumented shank 52*b* are abraded, the longest wires are first cut and shorter wires remain. Conductivity detection of the various wires by the electronic circuit 62 allows estimating a remaining height of the instrumented shank 52*b* and, as a result, a remaining height of the lifter 20. This technology is fragile, due to the presence of the internal channel 64. Also, a number of available data points along the height of the lifter 20 is limited by the number of wires that can be installed within the instrumented shank 52*b* of the extended bolt 50*b*.

Capacitance detection technology involves placing a coaxial cable (not shown) in the instrumented shank 52*b* of the extended bolt 50*b*. As the top 56 of the lifter 20 and the distal end 54*b* of the distal end 54*b* of instrumented shank 52*b* are abraded, the coaxial cable becomes shorter and a reduction of its capacitance is detected by the electronic circuit 62. This technology is also fragile, due to the presence of the internal channel 64. Additionally, the capacitance of the coaxial cable is small and difficult to measure given the important electrical noises caused by the large motor driving the SAG mill 10. Also, the presence of water or of steel particles within the rotating drum 14 of the SAG mill 10 may cause a short-circuit in the coaxial cable.

Therefore, there is a need for improvements in non-destructive measurement techniques for detecting wear of lifters in SAG mills that compensate for problems related to the fragility and the lack of precision of conventional measurement techniques for wear on lifters.

SUMMARY

According to the present disclosure, there is provided a device for monitoring wear of a lifter mounted in a mineral crusher. The device comprises an elongated bolt adapted for maintaining the lifter in place on an internal face of the mineral crusher and an EMAT transducer. The elongated bolt comprises a threaded section terminating at a proximal end of the elongated bolt and adapted for protruding externally through a hole on the internal face of the mineral crusher and for receiving a nut for maintaining the elongated bolt in place. The elongated bolt also comprises a shank terminating at a distal end of the elongated bolt opposite from the proximal end, a length of the shank extending along a height of the lifter, the distal end being adapted to wear at a rate equivalent to a rate of wear of the lifter when the mineral crusher is in operation. The transducer is coupled to the proximal end of the elongated bolt. The transducer is adapted to generate a sound wave within the proximal end of the elongated bolt, detect an echo of the sound wave reflected by the distal end of the elongated bolt, and report to a controller a time delay between the generation of the sound wave and the detection of the echo.

According to the present disclosure, there is also provided a system for monitoring wear of a plurality of lifters mounted in a mineral crusher. The system comprises a plurality of the devices for monitoring wear of a lifter mounted in a mineral crusher. One of more of the plurality of devices maintains one of the plurality lifters in place on the internal face of the mineral crusher. The system also comprises a controller operatively connected to the transducer of each of the plurality of devices. The controller is configured to receive a given time delay from any given device among the plurality of devices, determine a residual length of the elongated bolt of the given device based on the given time delay, and evaluate a wear of a given lifter maintained in place on the internal face of the mineral crusher by the given device based on the residual length of the given elongated bolt.

According to the present disclosure, there is also provided a method of assembling the device for monitoring wear of a lifter on a mineral crusher. The elongated bolt is mounted to the lifter. The lifter is mounted on the mineral crusher by inserting the threaded section of the elongated bolt through the hole on the internal face of the mineral crusher. The nut is tightened on the threaded section of the elongated bolt protruding externally from the mineral crusher. After tightening of the nut, the transducer is attached on the proximal end of the elongated bolt.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings. Unless otherwise stated, the various drawings are not to scale.

DETAILED DESCRIPTION

Figure 1:
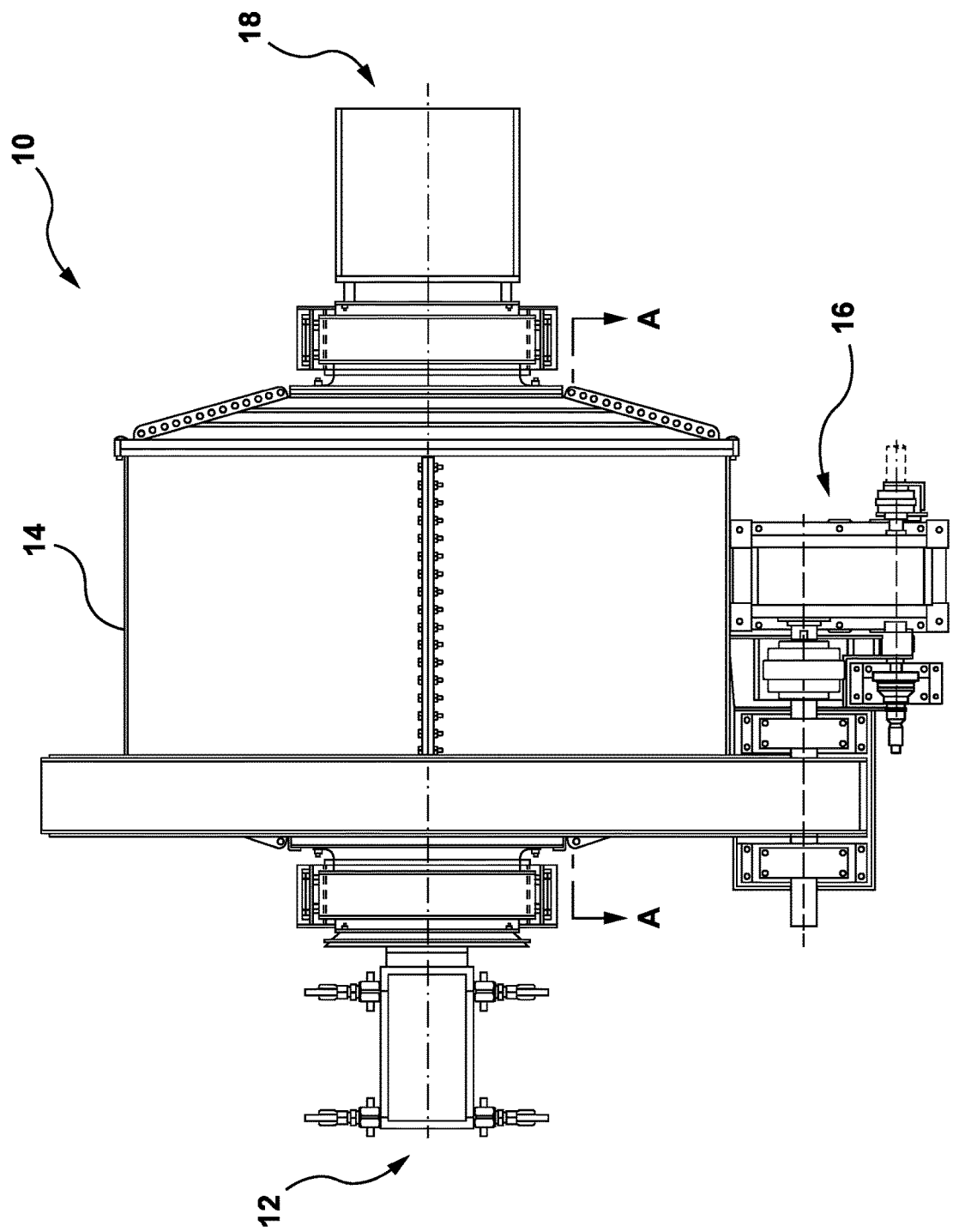
FIG. 1 (prior art) is a side elevation view of a SAG mill.
Figure 2A:
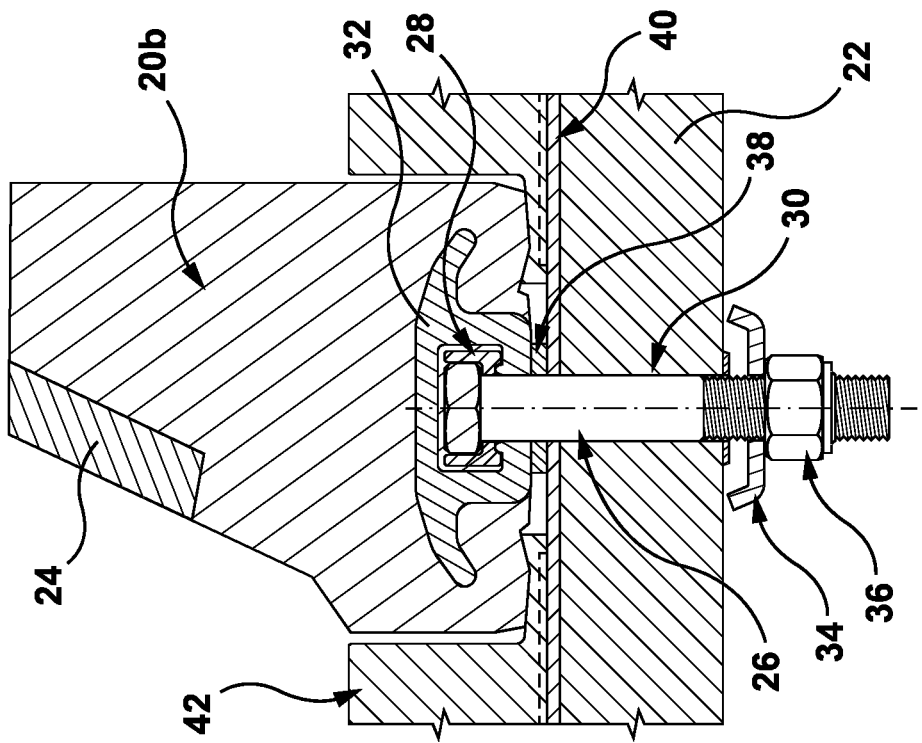
FIGS. 2a and 2b (prior art) are cross-sectional side views of a first and second variant of lifters mounted in the rotating drum of the SAG mill.
Figure 2B:
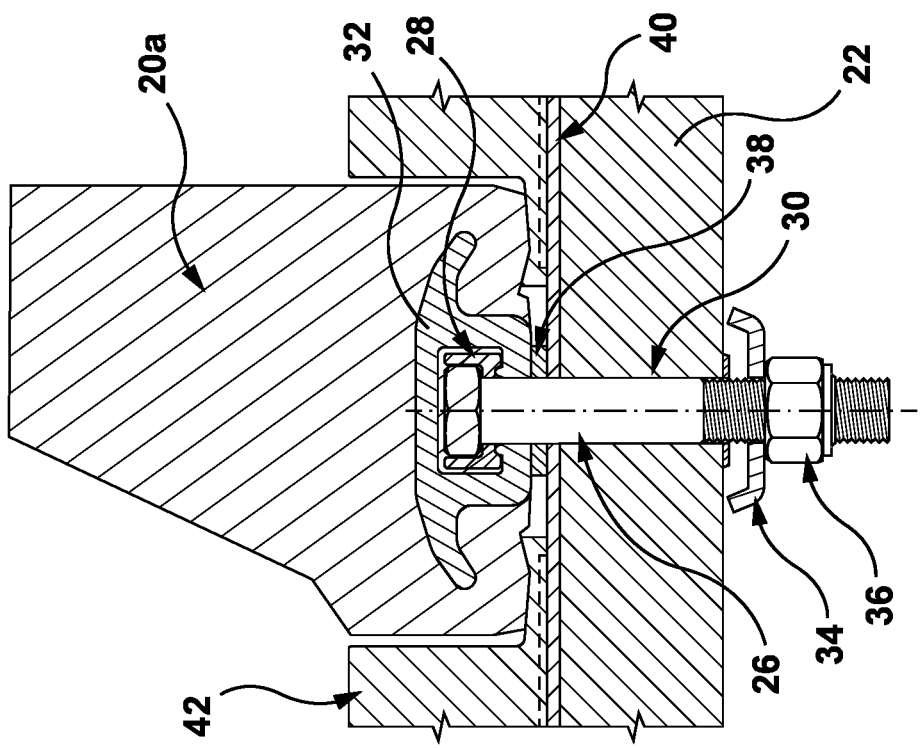

Various aspects of the present disclosure generally address one or more of the problems related to the fragility and the lack of precision of conventional measurement techniques for wear on lifters.

Generally speaking, the present technology relates to the measurement of wear on consumable components, for example steel lifters, rubber lifters, or hybrid lifters, that are used inside mineral crushers, such as autonomous grinding (AG) mills and semi-autogenous grinding (SAG) mills. These lifters cause ore rocks to tumble inside a rotating drum of the mineral crusher. This technology applies for example to mineral crushers used in processing of gold, copper, nickel, diamond, and other mining operations. In more details, the present technology relates to instrumentation on steel, rubber and hybrid lifters used on mineral crushers and other areas in the mining sector. Lifters are consumable items made out, for example, of steel or vulcanized rubber with or without steel inserts.

One or more devices are provided for monitoring wear of one or more lifters mounted in a mineral crusher. Each device comprises an elongated bolt used for maintaining the lifter in place on an internal face of the mineral crusher. The elongated bolt comprises a threaded section terminating at a proximal end of the elongated bolt and protruding externally through a hole on the internal face of the mineral crusher when the lifter and the elongated bolt are in place. A nut is received on the threaded section for maintaining the elongated bolt in place. The elongated bolt also comprises a shank terminating at a distal end of the elongated bolt opposite from the threaded section. A length of the shank extends in full or at least in part along a height of the lifter. The distal end is made to wear at a rate equivalent to a rate of wear of the lifter when the mineral crusher is in operation. A transducer is coupled to a proximal end of the elongated bolt, on the threaded section. The transducer generates a sound wave applied to the proximal end of the elongated bolt. The sound wave may have an ultrasonic frequency, with a frequency range depending on a type of the transducer. The transducer detects an echo of the sound wave reflected by the distal end of the elongated bolt and reports to a controller a time delay between the generation of the sound wave and the detection of the echo. The controller evaluates a residual length of the elongated bolt based on the reported time delay, and therefore evaluates the wear of the lifter. The controller may receive such reports from a plurality of devices. In one configuration, one or more devices provide wear information for a given lifter. In the same or another configuration, various devices provide wear information for various lifters mounted in the mineral crusher.

The present technology may also be used to monitor wear of lifters made of materials other than steel or rubber and to monitor wear of other consumable components of mineral crushers of various types, or related equipment. The present description refers to the SAG mill 10 and to the lifters 20 as introduced hereinabove for illustration purposes and with no intent to limit the present disclosure.

Figure 9:
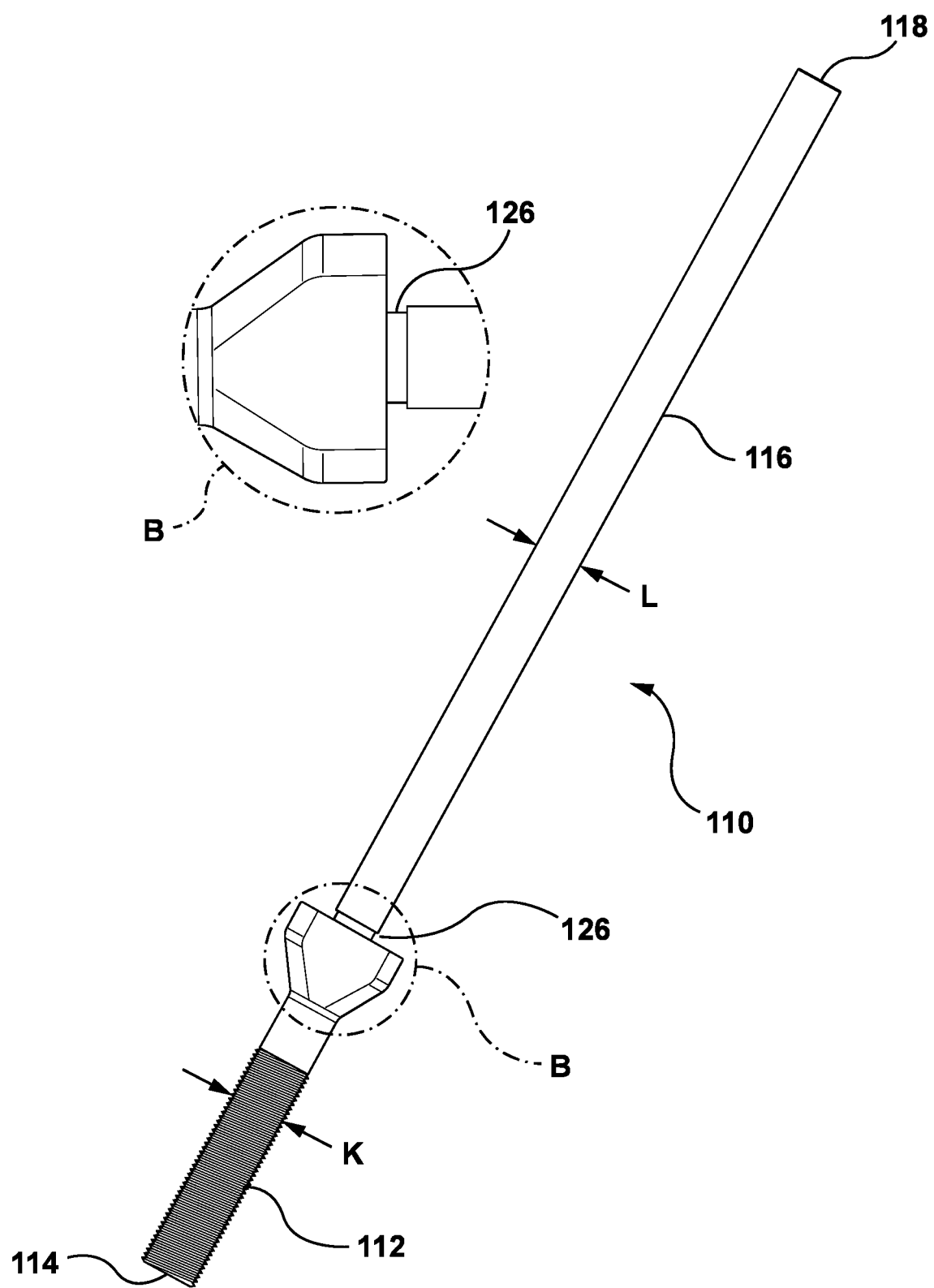
FIG. 9 is a perspective view of an elongated bolt according to an embodiment of the present disclosure.
Figure 10:
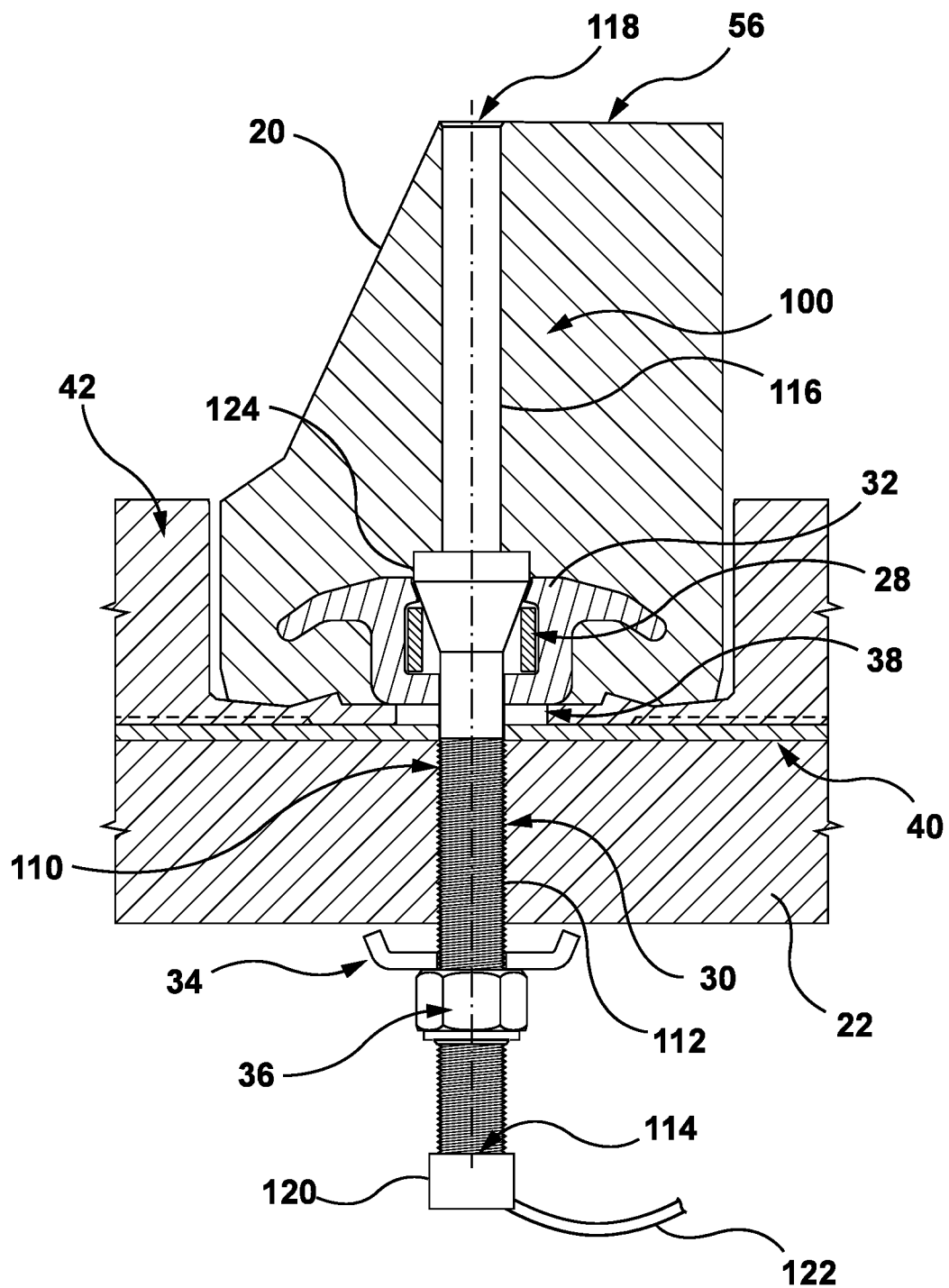
FIG. 10 is a cross-sectional side view of a wear monitoring device supporting a rubber lifter mounted in the rotating drum of the SAG mill according to an embodiment of the present disclosure.
Figure 11:
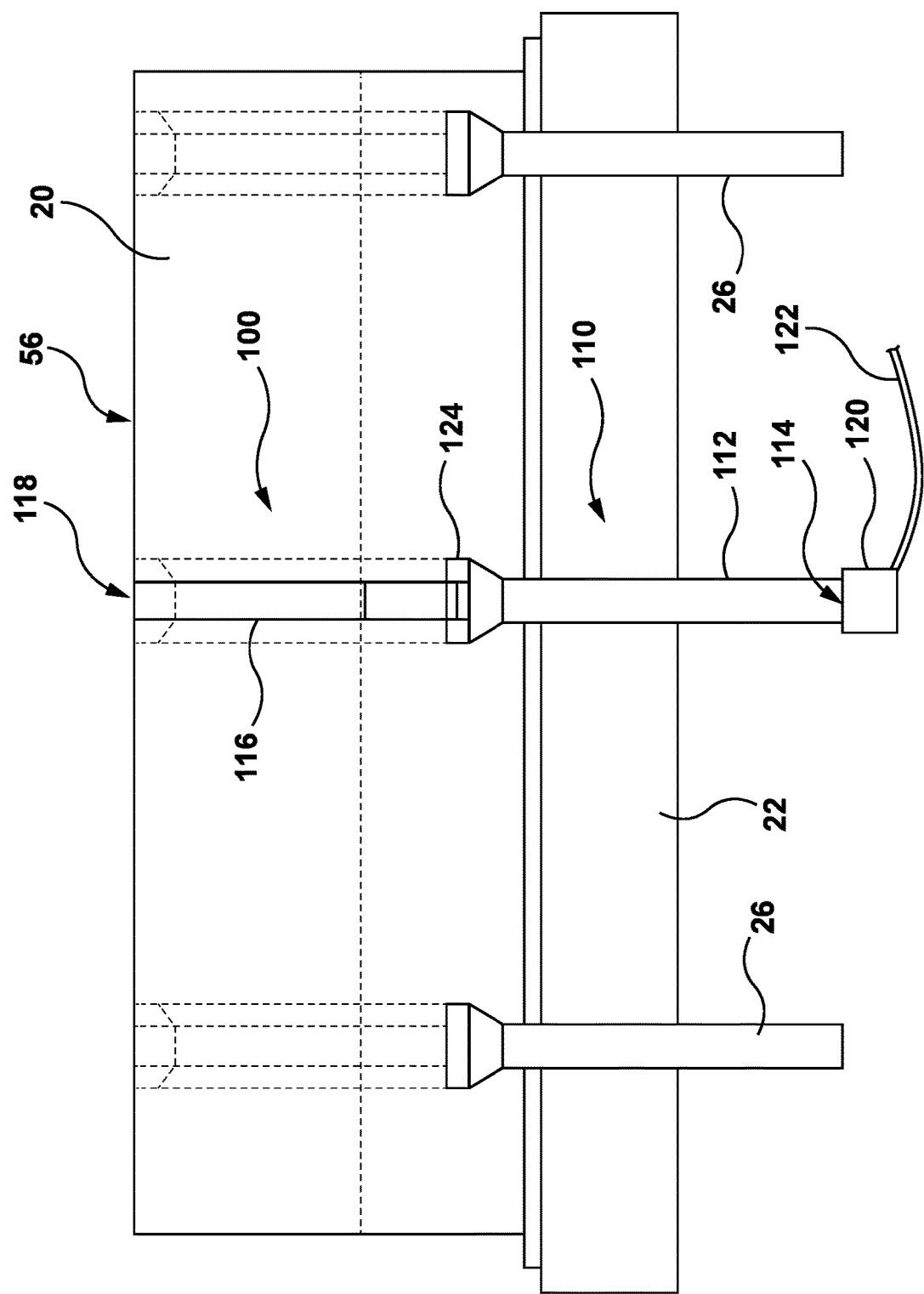
FIG. 11 is a cross-sectional front view of the wear monitoring device supporting a steel lifter mounted in the rotating drum of the SAG mill according to an embodiment of the present disclosure.

Referring now to the drawings, FIG. 9 is a perspective view of an elongated bolt according to an embodiment of the present disclosure. FIG. 10 is a cross-sectional side view of a wear monitoring device supporting a rubber lifter mounted in the rotating drum of the SAG mill according to an embodiment of the present disclosure. FIG. 11 is a cross-sectional front view of the wear monitoring device supporting a steel lifter mounted in the rotating drum of the SAG mill according to an embodiment of the present disclosure. Referring to FIGS. 9, 10 and 11, a wear monitoring device 100 is adapted for monitoring wear of a lifter 20 mounted in a mineral crusher, for example and without limitation when the lifter 20 is mounted in the rotating drum 14 of the SAG mill 10 of FIG. 1. The same device 100 may be used with a rubber lifter as shown on FIG. 10 or with a steel lifter as shown on FIG. 11. The device 100 comprises an elongated bolt 110 and a transducer 120. The elongated bolt 110 is useable for maintaining the lifter 20 in place on an internal face of the SAG mill 10. The elongated bolt 110 comprises a threaded section 112 that terminates at a proximal end 114 of the elongated bolt 110. At least a part of the threaded section 112 including the proximal end 114 protrudes externally through a hole 30 pierced on the internal face and through the steel shell 22 of the SAG mill 10. A nut 36 is tightened on the threaded section 112 for maintaining the elongated bolt 110 in place. The elongated bolt 110 also comprises a shank 116 terminating at a distal end 118 of the elongated bolt 110 opposite from the proximal end 114.

A length of the shank 116 extends at least in part along a height of the lifter 20. The distal end 118 of the elongated bolt 110 is adapted to wear at a rate equivalent to a rate of wear of the lifter 20 when the SAG mill 10 is in operation. The transducer 120 is coupled to the proximal end 114 of the elongated bolt 110. Depending on a type of the transducer, this coupling of the transducer 120 to the proximal end 114 does not require an actual, solid contact of the transducer 120 and the elongated bolt 110, provided that the transducer 120 is near the proximal end 114 of the elongated bolt 110. The transducer 120 is adapted to generate a sound wave applied to the proximal end 114 of the elongated bolt 110, detect an echo of the sound wave reflected by the distal end 118 of the elongated bolt 110, and report to a controller 200 (FIG. 14), via a signaling wire 122, a time delay between the generation of the sound wave and the detection of the echo. As the top 56 of the lifter 20 is worn by and ongoing operation of the SAG mill 10, the distal end 118 of the elongated bolt 110 is worn at substantially the same rate so that the distal end 118 remains substantially level with the remaining top 56 of the lifter 20. Hence, the time delay reported to the controller 200 by the transducer 120 is representative of the wear of the lifter 20. Otherwise stated, the time delay is representative of a remaining height of the lifter 20.

In an embodiment, the threaded section 112 of the elongated bolt 110 has a diameter 'K' and the shank 116 of the elongated bolt 110 has a diameter 'L' that is equal to or less than the diameter 'K' in order to facilitate transmission and reflection of the sound wave generated by the transducer. In the same or another embodiment, the elongated bolt 110 is made of steel. Use of other materials that can abrade concurrently with the lifter 20 and that allow transmission and reflection of the sound wave generated by the transducer is also contemplated.

FIG. 10 shows that the steel channel 28, the aluminum extrusion 32, the cup washer 34, the support 38, the rubber gasket 40 and the rubber packing 42 may also be part of the assembly of the lifter 20 and of the elongated bolt 110 on the SAG mill 10.

FIG. 11 shows an example of an application in which a lifter 20 is maintained by a centrally positioned elongated bolt 110 and by two laterally positioned bolts 26 of a more conventional nature. FIG. 11 is only one of many possible configurations, as a plurality of devices 100 may be used to monitor the wear of a given lifter 20. Also, the SAG mill 10 having a plurality of lifters 20 mounted in its rotating drum 14, one or more devices 100 may be mounted on all or on a subset of the lifters 20 of the SAG mill 10.

In an embodiment, the length of the shank 116 matches the height of the lifter 20 in the absence of wear on the lifter 20. In another embodiment, the length of the shank 116 may be somewhat shorter than the original height of a new lifter 20. In that embodiment, the device 100 will start detecting the wear on the lifter 20 when the top 56 of the lifter 20 has been abraded until it reaches the distal end 118 of the elongated bolt 110.

As shown on FIGS. 9, 10 and 11, the elongated bolt 110 may further comprises a shoulder 124 at a junction of the threaded section 112 and of the shank 116. The shoulder 124 is configured to prevent a relative movement between the elongated bolt 110 and the lifter 20 when assembled. The shoulder 124 may for example have an oblong shape. In an embodiment, the threaded section 112 and the shoulder 124 are forged in one piece and the shank 116 is connected to the shoulder 124 by friction welding, a joint 126 between the shank 116 and the shoulder 124 being visible in detail B of FIG. 9.

Figure 12:
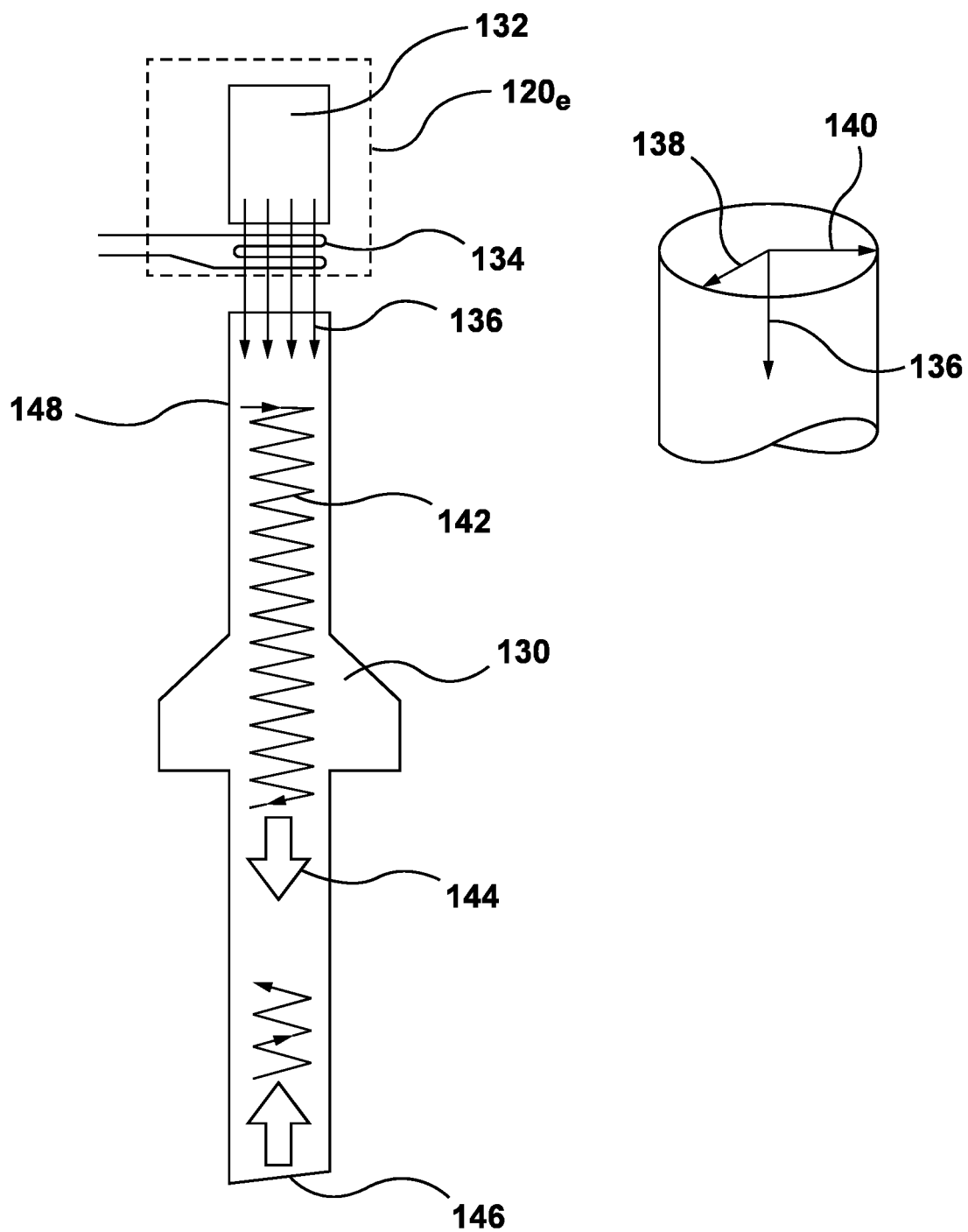
FIG. 12 is an illustration of a propagation direction of a shear wave in a solid material.

In an embodiment, the transducer 120 is an acoustic emission (AE) transducer. In another embodiment, the transducer 120 is an electromagnetic acoustic transducer (EMAT). FIG. 12 is an illustration of a propagation direction of a shear wave in a solid material. An EMAT 120e mounted on a solid material 130 includes a magnet 132 and a coil circuit 134. The magnet 132 generates a bias magnetic field 136 within the solid material 130 and the coil circuit generates 134 Eddy currents 138 that interact with the bias magnetic field 136 to induce Lorentz forces 140 on a surface of the solid material 130. A disturbance caused by the Lorentz forces 140 induces an ultrasonic sound wave 142 that propagates within the solid material 130 in a direction 144 normal to a plane defined by the Eddy currents 140 and the Lorentz forces 138. The ultrasonic sound wave 142 may be reflected by a discontinuity in the solid material 130 and generate an echo, for example when the ultrasonic sound wave 142 reaches an extremity 146 of the solid material 130. The echo follows a path in a direction opposite from the direction 144 of the ultrasonic sound wave 142 and is detected by the coil circuit 134, allowing to detect a time delay being the generation of the ultrasonic sound wave 142 and the detection of the echo.

Figure 7:
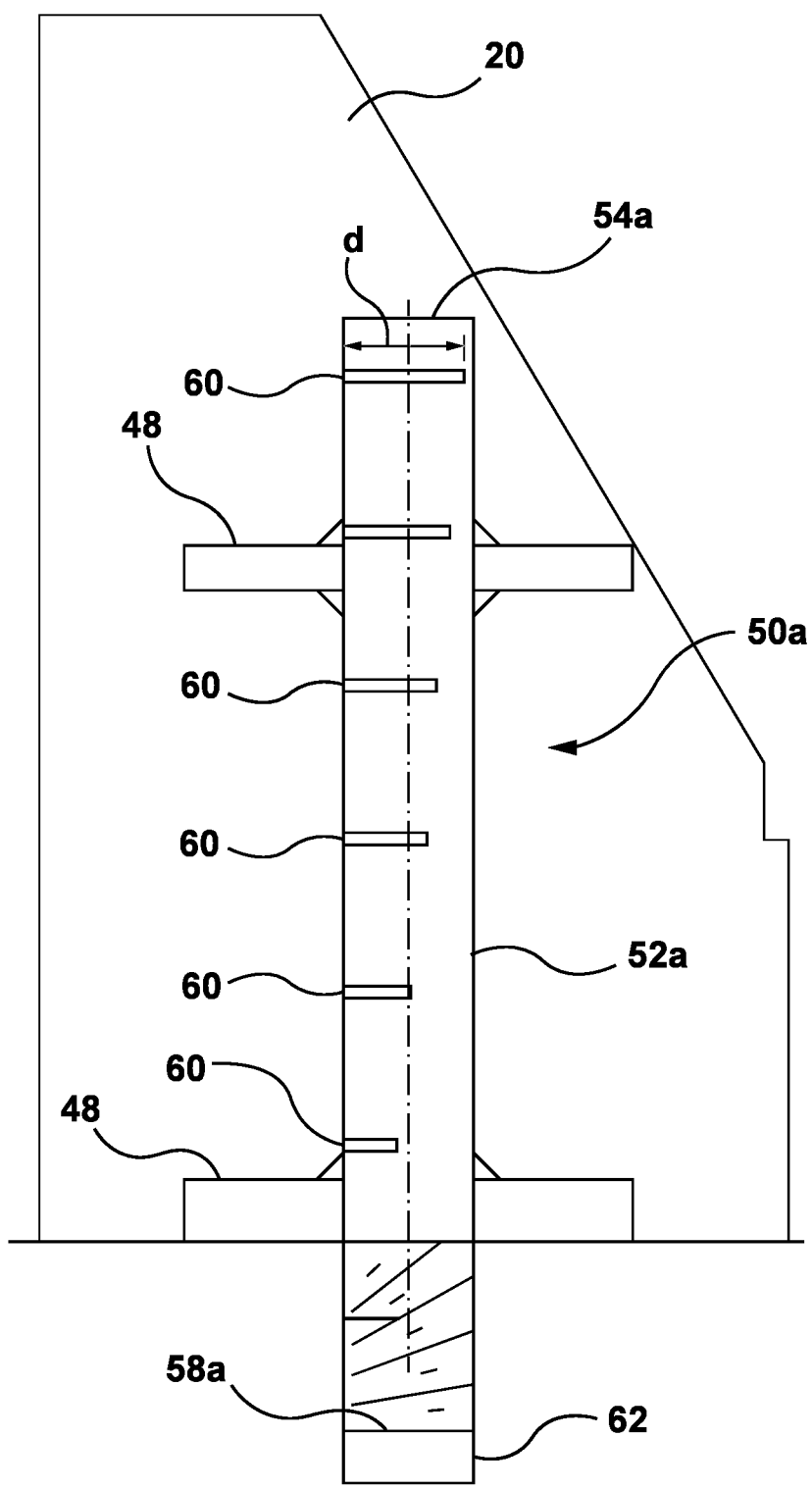
FIG. 7 (prior art) is a side elevation, cross-sectional view of a lifter and of a variant of the extended bolt adapted for ultrasonic technology sensing.
Figure 8:
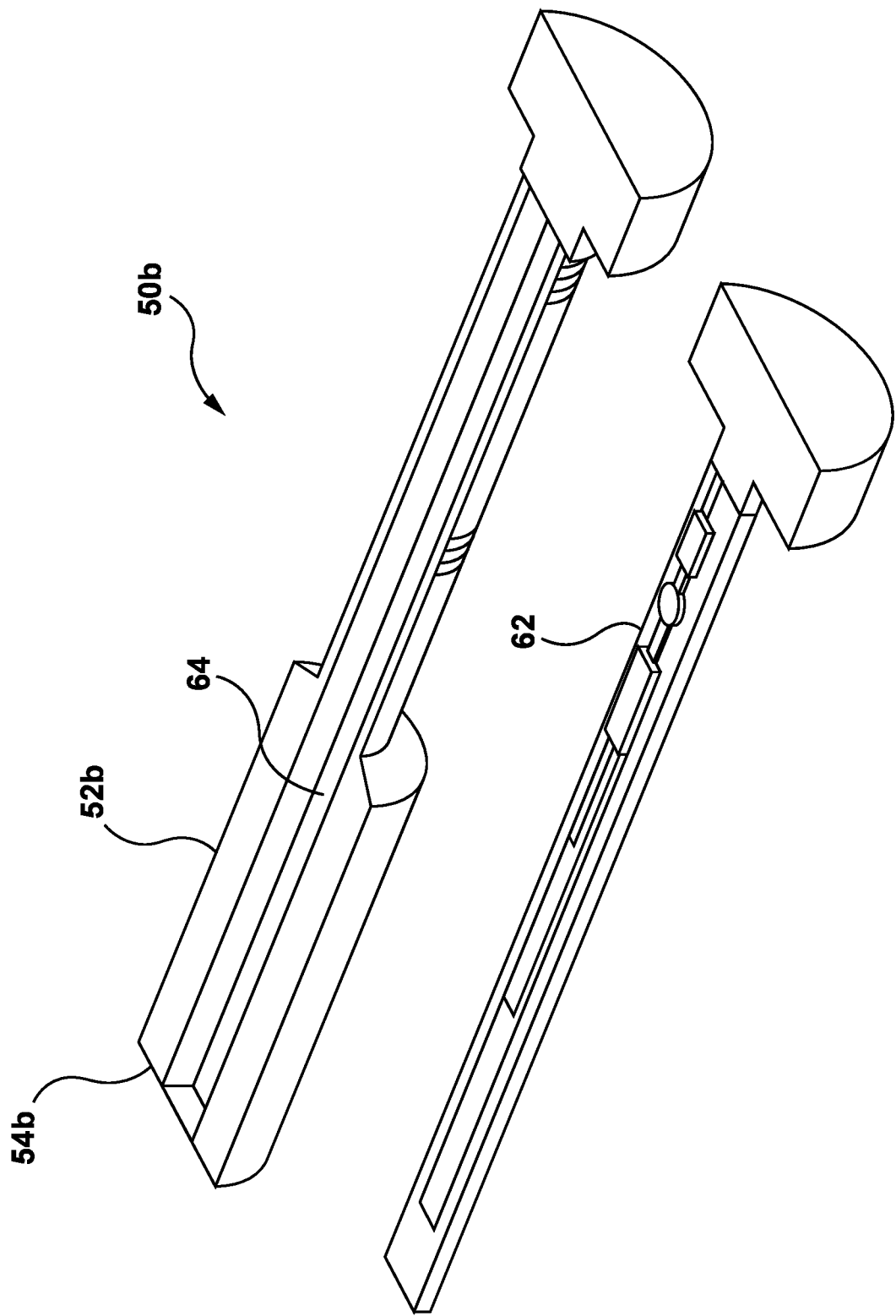
FIG. 8 (prior art) is a perspective, cross-sectional view of another variant of the extended bolt adapted for capacitive or resistive sensing.

Particles of the solid material 130 oscillate in a direction 148 normal to the propagation direction 144 of the ultrasonic sound wave 142. When compared to ultrasonic technology sensing (FIG. 7), the ultrasonic sound wave 142 generated by the EMAT travels at a lower speed within the solid material 130. Hence, the time delay between the generation of the ultrasonic sound wave 142 and the detection of the echo is longer than a time delay obtained using ultrasonic technology sensing. Using EMAT technology in the device 100 translates into an increased accuracy of the wear of the lifter 20. It may be noted that, because the sound wave 142 is a shear wave, the propagation direction 144 of the echo of sound wave 142 is not significantly impacted by an eventual angle between the direction of the incident sound wave 142 and the extremity 146 of the solid material 130. Consequently, using EMAT technology in the device 100 limits the potential effect of an angular wear of the distal end 118 of the elongated bolt 110.

Figure 13:
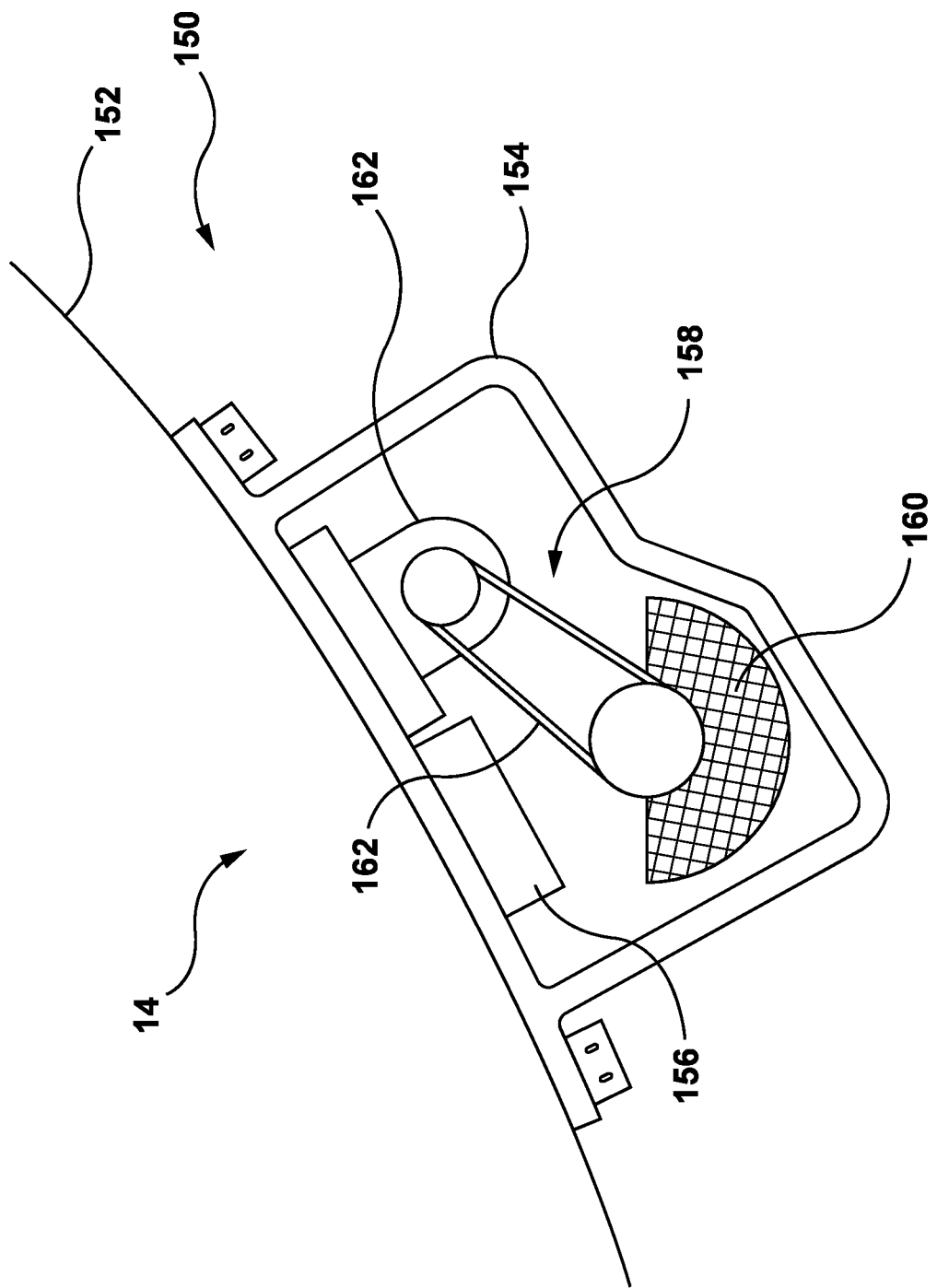
FIG. 13 is a cross-sectional side view of a power supply according to an embodiment of the present disclosure.

FIG. 13 is a cross-sectional side view of a power supply according to an embodiment of the present disclosure. One or more devices 100 being mounted on the rotating drum 14 of the SAG mill 10, the provision of electric power to these devices 100 would be problematic using conventional techniques. This may particularly be the case when the transducer 120 is an EMAT because this technology consumes more electric power than other sensing technologies. In an embodiment, a power supply 150 is mounted on an external face 152 of the rotating drum 14. The power supply 150 is enclosed in a housing 154 mounted on the external face 152 of the rotating drum 14. The power supply comprises a battery 156 contained in the housing 154 that supplies electric power via electric wires (FIG. 14) to each of the one or more devices 100 mounted on the SAG 10 and to the controller 200. The housing 154 also contains a generator 158 that comprises a pendulum 160 and a charger 162 connected to the pendulum 160 by a belt 163, by a gearset (not shown) or by any other equivalent mechanism. As the rotating drum 14 rotates, a movement of the pendulum 160 causes the charger 162 to generate electric power to charge the battery 156. Consequently, when the rotating drum 14 of the SAG mill 10 is in operation, each device 100 becomes energized and capable of reporting to the controller 200 their respective time delay between the generation of the sound wave and the detection of the echo, and the controller 200 becomes energized and capable of receiving and treating this information.

Figure 14:
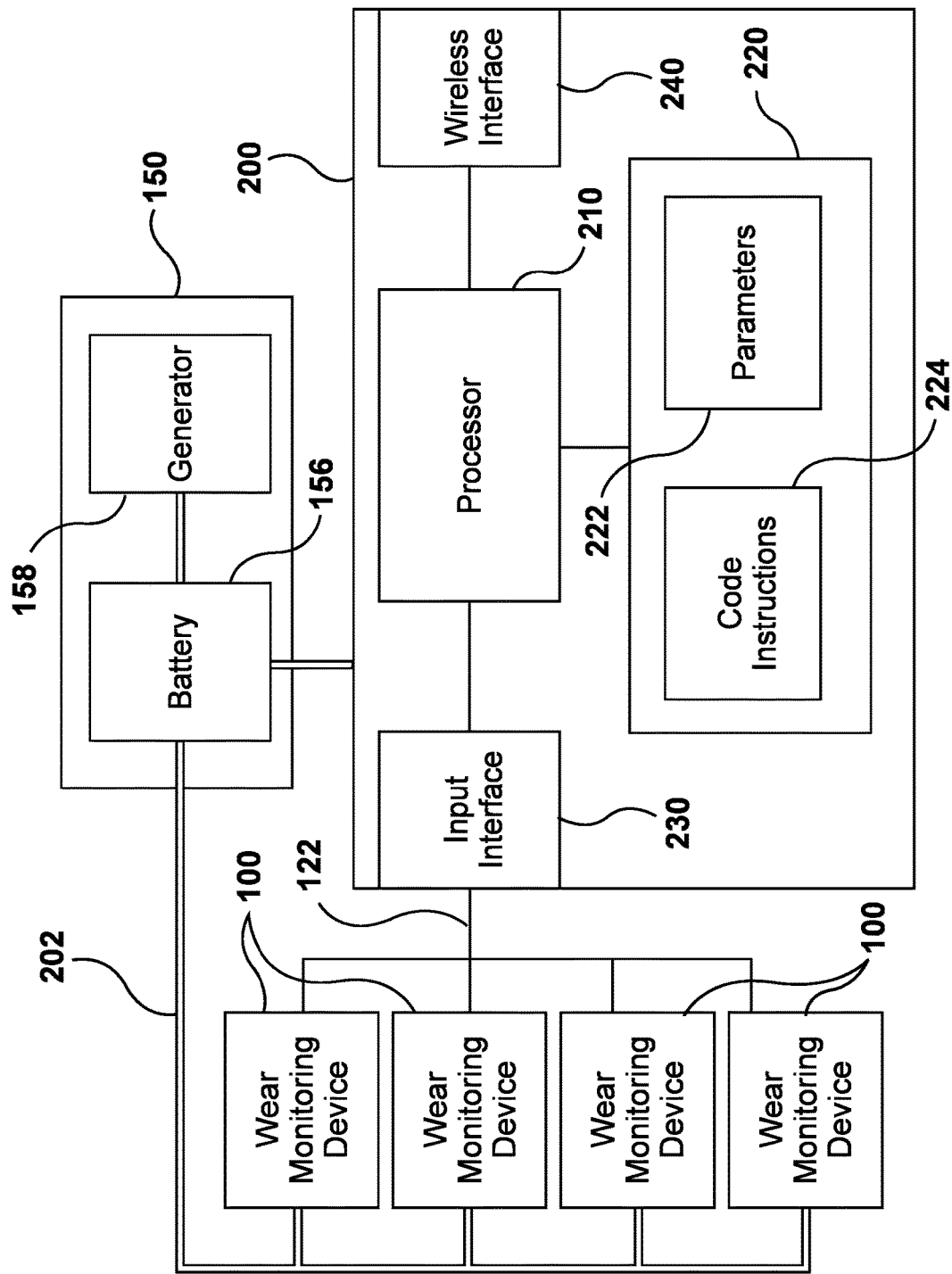
FIG. 14 is an electrical diagram of a system for monitoring wear on lifters of a mineral crusher according to an embodiment of the present disclosure.

FIG. 14 is an electrical diagram of a system for monitoring wear on lifters of a mineral crusher according to an embodiment of the present disclosure. The system comprises the earlier mentioned controller 200 and a plurality of the devices 100. The controller 200 comprises a processor or a plurality of cooperating processors (represented as a processor 210 for simplicity), a memory device or a plurality of memory devices (represented as a memory device 220 for simplicity), an input interface or a plurality of input interfaces (represented as an input interface 230 for simplicity) receiving time delay information from the devices 100, and a wireless communication interface 240. The wireless communication interface 240 may, for example and without limitation, support WiFi, Bluetooth™, 4G and/or 5G transmission technologies. The processor 210 is operatively connected to the memory device 220, to the input interface 230 and to the wireless communication interface 240. The memory device 220 includes a storage 222 for storing parameters, including for example reference values allowing the controller 200 to interpret time delay values reported by the devices 100. The memory device 220 may also comprise a non-transitory computer-readable medium 224 for storing instructions that are executable by the processor 210.

The controller 200, and more specifically the input interface 230, is connected via the signaling wire 122 or via a plurality of signaling wires 122 to the transducer 120 of each device 100. In an embodiment, the transducer 120 of each device 100 provides an electronic identification to the controller 200, allowing the controller 200 to identify each device 100 based on the provided electronic identification. As a result, time delay information provided by a plurality of the devices 100 may be multiplexed on a single signaling wire 122. In a non-limiting example, two or more devices 100 mounted on a same lifter 20 may be connected to the controller 200 via a common signaling wire 122.

The controller 200 and the devices 100 are each connected to the power supply 150 via electric wires 202. In an embodiment, the controller 200 and the power supply 150 may be proximally located on the external face 152 of the rotating drum 14, allowing bundling of some of the electric wires 202 with the signaling wire or wires 122.

In operation, the controller 200 receives a given time delay from any given device 100 connected via the signaling wire or wires 122. Using parameters stored in the storage 222, the processor 210 determines a residual length of the elongated bolt 110 of the given device 100 based on the given time delay. The processor 210 then evaluates a wear of a given rubber lifter 20 maintained in place on the internal face of the SAG mill 10 (specifically on the internal face of the rotating drum 14) by the given device 100 based on the residual length of the given elongated bolt 110. In an embodiment, the processor 210 may monitor the wear of one or more lifters 20 in real-time. In the same or another embodiment, the processor 210 may evaluate a rate of wear of the lifters 20. The processor 210 may cause the wireless interface 240 to transmit wear information about the lifters 20 of the SAG mill 10 to an external server (not shown).

In an embodiment, two or more devices 100 may be used to evaluate the wear on a given one of the plurality lifters 20 mounted in the SAG mill 10. In a non-limiting example, one device 100 may be mounted near the feed end 12 of the SAG mill 10 and another device 100 may be mounted closer to the discharge end 18 of the SAG mill 10. The controller 200 may thus evaluate a gradient of wear a given lifter 20 based on positions of two or more devices 100 connected to that given lifter 20. In the same or another embodiment, devices 100 may be mounted on a subset of the lifters 20 mounted in the SAG mill 10, considering that several lifters mounted in similar positions within the rotating drum 14 may be expected to wear at a similar rate.

Figure 3:
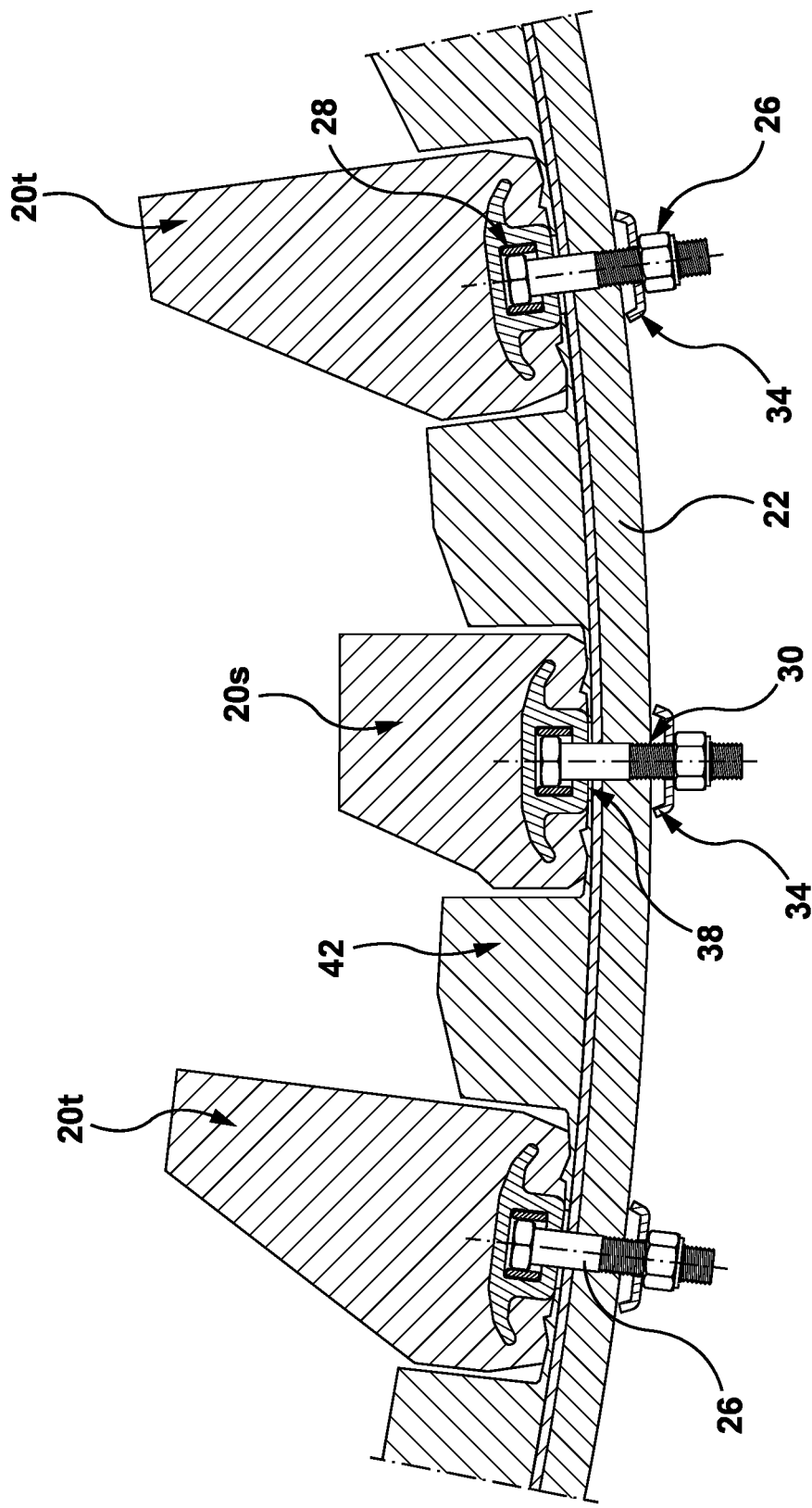
FIG. 3 (prior art) is a cross-sectional view of adjacent lifters mounted in the rotating drum of the SAG mill.
Figure 4A:
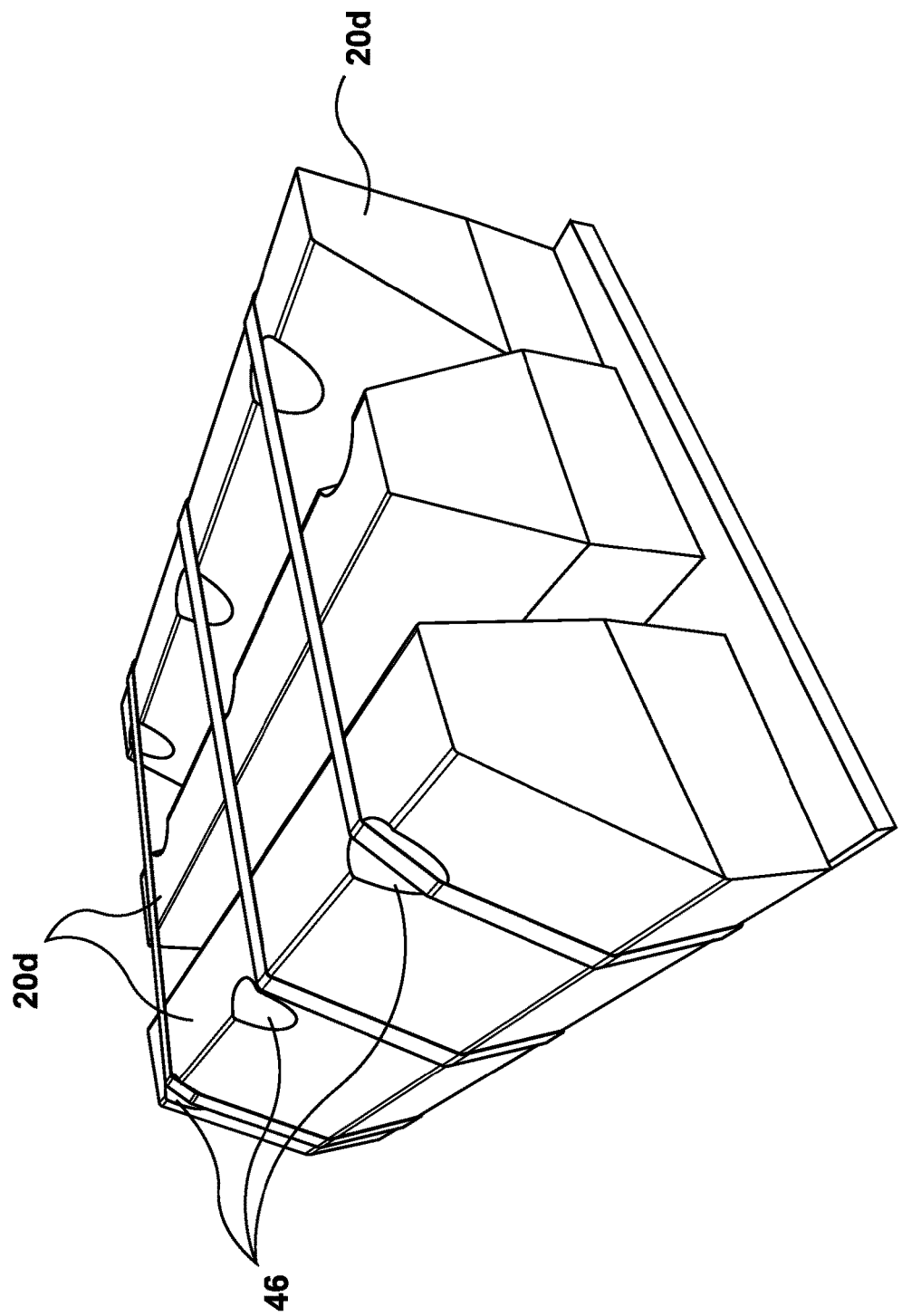
FIG. 4a (prior art) is a perspective view of a number of new lifters.
Figure 4B:
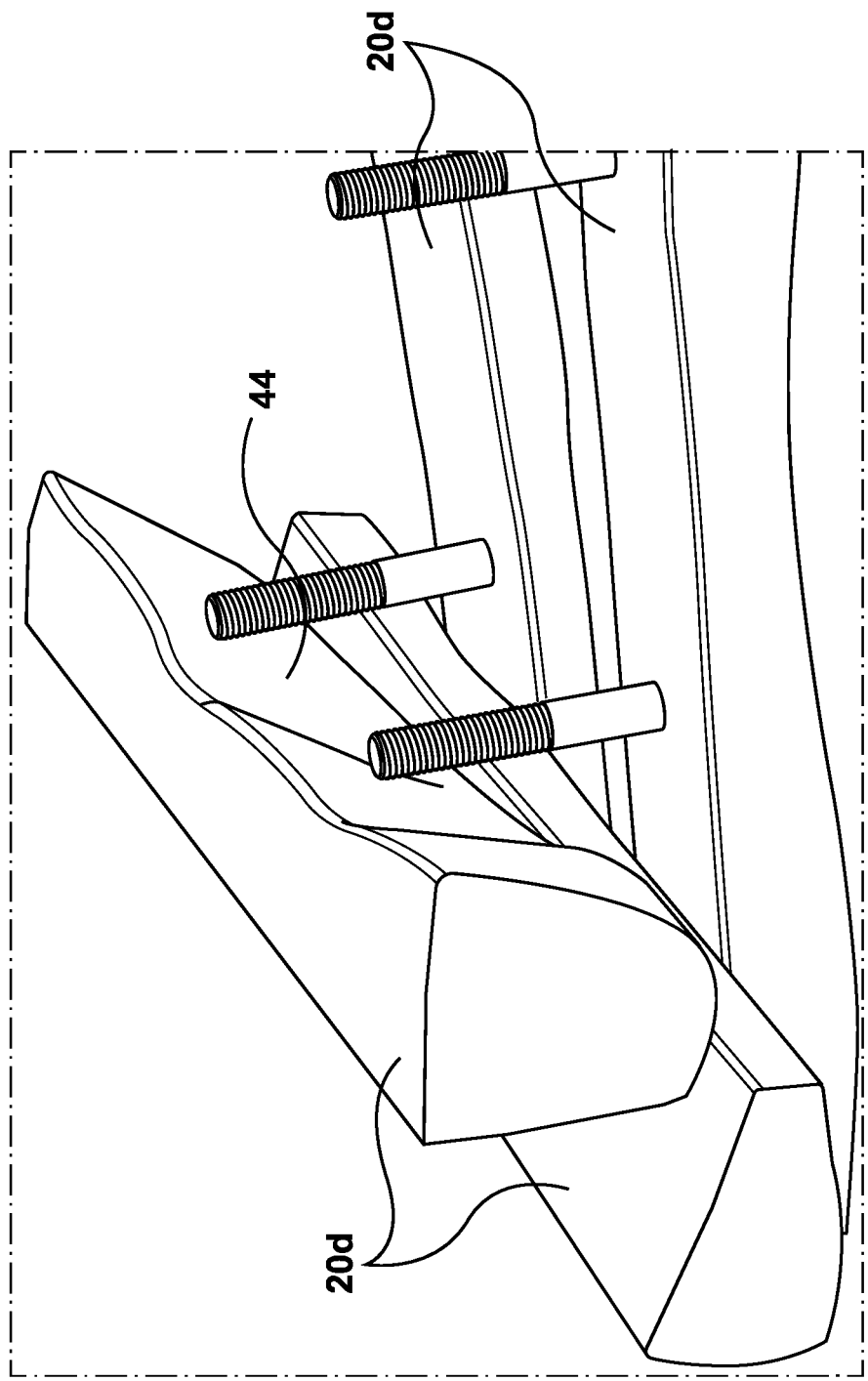
FIG. 4b (prior art) is a perspective view of a number of worn lifters.
Figure 5:
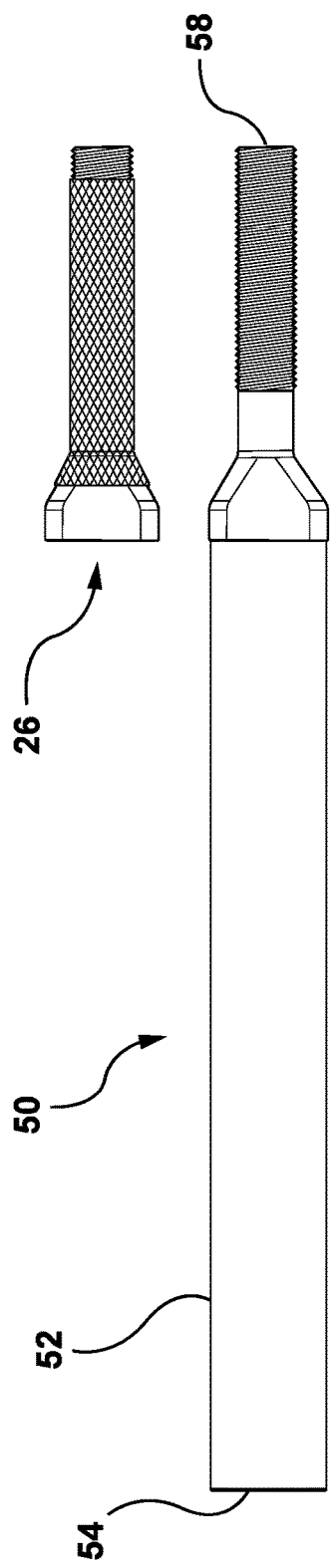
FIG. 5 (prior art) shows a conventional bolt for mounting a lifter and an extended bolt including a measurement device.
Figure 6:
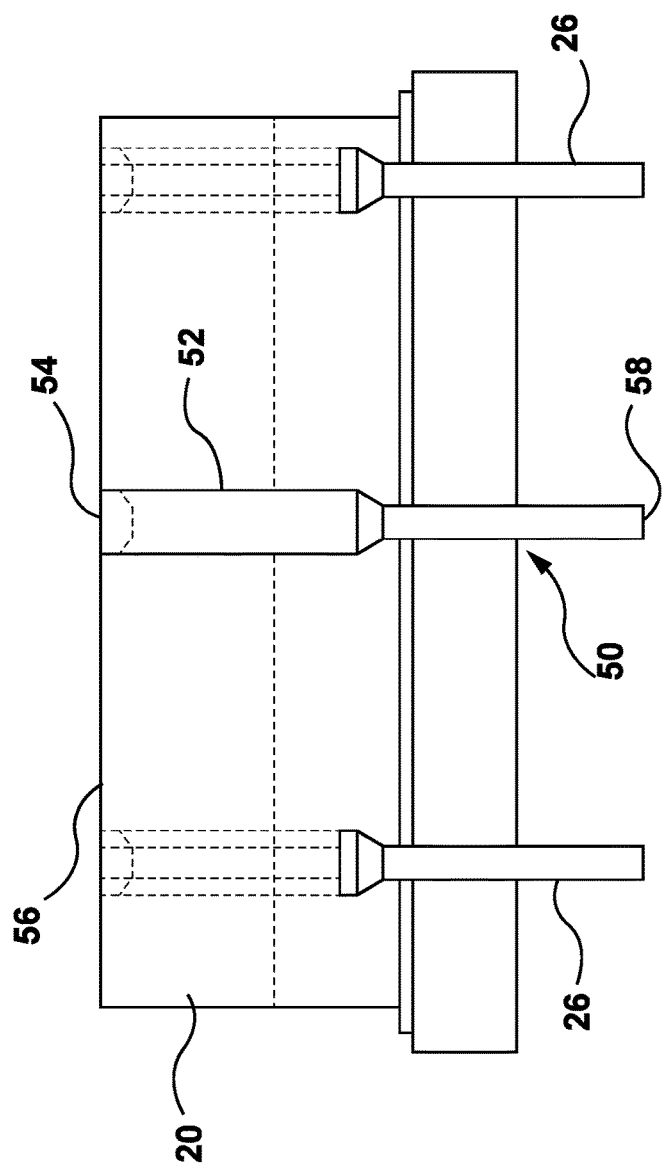
FIG. 6 (prior art) is a cross-sectional front view of a lifter supported by traditional and extended bolts.

In another embodiment, tall lifters 20t may alternate with short lifters 20s within the SAG mill 10, in a pattern shown for example on FIG. 3. It may be expected that all tall lifters 20t will wear at a first similar rate while the short lifters will all wear at a second similar rate different from the first similar rate. One or more first devices 100 in which the elongated bolts 110 each has a shank 116 dimensioned for extending along the height of the short lifters 20s may be used to maintain one or more of the short lifters 20s in place within the SAG mill 10. Each of the one or more first devices 100 reports a respective first time delay to the controller 200. One or more second devices 100 in which the elongated bolts 110 each has a shank 116 dimensioned for extending along the height of the tall lifters 20t may be used to maintain one or more of the tall lifters 20t in place within the SAG mill 10. Each of the one or more second devices 100 reports a respective second time delay to the controller 200. The processor 210 uses the reported first and second time delays to derive a wear profile for the plurality of short and tall lifters 20s and 20t in the SAG mill 10.

Figure 15:
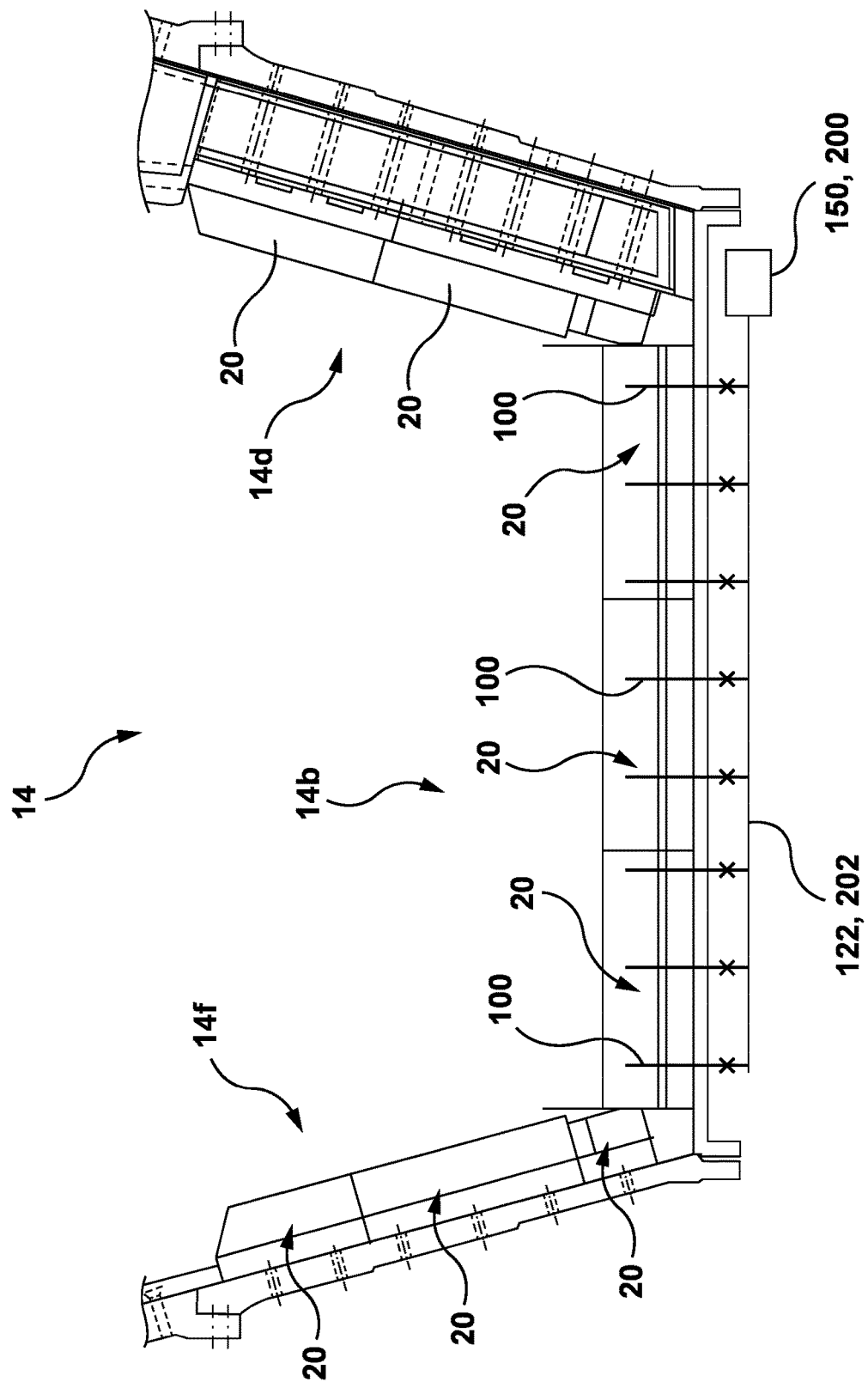
FIG. 15 is an example of a configuration of the wear monitoring devices on the rotating drum of a mineral crusher according to an embodiment of the present disclosure.

FIG. 15 is an example of a configuration of the wear monitoring devices on the rotating drum of a mineral crusher according to an embodiment of the present disclosure. FIG. 15 shows a cross-section of the rotating drum 14 taken along line A-A on FIG. 1. In the non-limiting example of FIG. 15, three lifters 20 are distributed along a length of a horizontal section 14h of the rotating drum 14 and each lifter 20 is maintained in place using two or three elongated bolts 110, without using any conventional bolt 26. Eight devices 100 are connected via a common signaling wire 122 and a common electric wire 202 to the power supply 150 and to the controller 200. Other configurations are also contemplated. For example, additional lifters 20 are mounted on a section 14f of the rotating drum 14, where the material to be crushed is directly received from the feed end 12, and on a section 14d of the drum rotating 14 leading to the discharge end 18, where crushed material is discharged from the SAG mill 10. Devices 100 may be mounted on any one of the lifters 20 on the sections 14f and/or 14d of the rotating drum 14. Additionally, lifters 20 are distributed in successive rows on an internal circumference of the rotating drum 14, as suggested for example on FIG. 3. Devices 100 may be mounted on any one of the lifters 20, on any row in the rotating drum 14, the devices 100 being possibly used jointly with conventional bolts 26 for maintaining any one of the lifters 20. Historical information about wear of lifters 20 in a given SAG mill 10 and about a type of material being crushed in the SAG mill 10 may be used to select a number, location and disposition of the devices 100 within the rotating drum 14.

Figure 16:
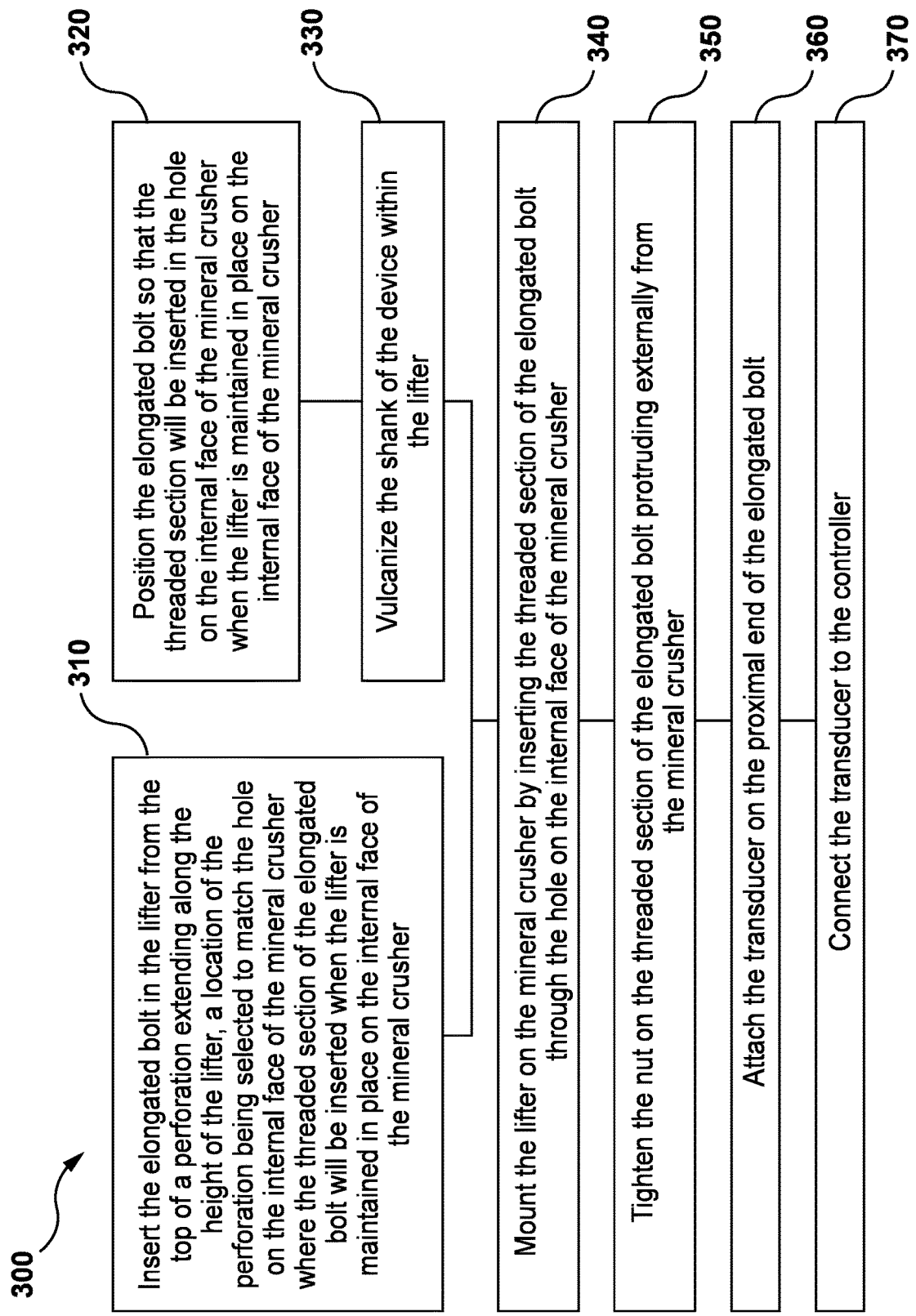
FIG. 16 is a sequence diagram showing operations of a method of assembling the wear monitoring device on the mineral crusher according to an embodiment of the present disclosure.

FIG. 16 is a sequence diagram showing operations of a method of assembling the wear monitoring device on the mineral crusher according to an embodiment of the present disclosure. On FIG. 16, a sequence 300 comprises a plurality of operations, some of which may be executed in variable order, some of the operations possibly being executed concurrently, some of the operations being optional. The elongated bolt 110 is first mounted to the lifter 20. If the lifter 20 is a steel lifter, mounting the elongated bolt 110 to the lifter 20 comprises inserting the elongated bolt 110 from a top of the perforation 46 that extends along the height of the lifter 20 at operation 310. A location of the perforation 46 has been selected to match the hole 30 on the internal face of the SAG mill 10 where the threaded section 112 of the elongated bolt 110 will be inserted when the lifter 20 is maintained in place on the internal face of the SAG mill 10. If the lifter 20 is a rubber lifter or a hybrid lifter, mounting the elongated bolt 110 to the lifter 20 comprises positioning the elongated bolt 110 at operation 320 so that its threaded section 112 will be inserted in the hole 30 of the internal face of the SAG mill 10 when the lifter 20 is maintained in place on the internal face of the SAG mill 10, and vulcanizing the shank 116 of the elongated bolt 110 within the lifter 20 at operation 330.

In any case, the lifter 20 with the attached elongated bolt 110 is then installed on the SAG mill 10 at operation 340 by inserting the threaded section 112 of the elongated bolt 110 through the hole 30 on the internal face of the SAG mill 10. At operation 350, the nut 30 is tightened on the threaded section 112 of the elongated bolt 110, the threaded section 112 being at the time protruding externally from the SAG mill 10. After tightening of the nut, the transducer 120 is attached on the proximal end 114 of the elongated bolt 110 at operation 360. The transducer 120 is connected to the controller 200, via the signaling wire 122 at operation 370.

Various operations of the sequence 300 may be configured to be processed by one or more processors, the one or more processors being coupled to one or more memory devices, including for example the processor 210 and the memory device 220 illustrated on FIG. 14.

Those of ordinary skill in the art will realize that the description of the device and of the system for monitoring wear of lifters mounted in a mineral crusher, and of the method of assembling the device on the mineral crusher are illustrative only and are not intended to be in any way limiting. Other embodiments will readily suggest themselves to such persons with ordinary skill in the art having the benefit of the present disclosure. Furthermore, the disclosed device, system and method may be customized to offer valuable solutions to existing needs and problems related to the fragility and the lack of precision of conventional measurement techniques for wear on lifters. In the interest of clarity, not all of the routine features of the implementations of the device, system and method are shown and described. In particular, combinations of features are not limited to those presented in the foregoing description as combinations of elements listed in the appended claims form an integral part of the present disclosure. It will, of course, be appreciated that in the development of any such actual implementation of the device, system and method, numerous implementation-specific decisions may need to be made in order to achieve the developer's specific goals, such as compliance with application-related, system-related, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of non destructive testing having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory device, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory device of servers, workstations, personal computers, computerized tablets, personal digital assistants (PDA), and other devices suitable for the purposes described herein. Software and other modules may be accessible via a local memory device, via a network, via a browser or other application or via other means suitable for the purposes described herein. Data structures described herein may comprise computer files, variables, programming arrays, programming structures, or any electronic information storage schemes or method, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A device for monitoring wear of a wearable device mounted in a mining equipment, comprising:
   an elongated bolt adapted for maintaining the wearable device in place on a face of the mining equipment, the elongated bolt comprising:
      a threaded section terminating at a proximal end of the elongated bolt and adapted for protruding externally through a hole on the face of the mining equipment and for receiving a nut for maintaining the elongated bolt in place, and
      a shank terminating at a distal end of the elongated bolt opposite from the proximal end, a length of the shank extending along a height of the wearable device, the distal end being adapted to wear at a rate equivalent to a rate of wear of the wearable device when the mining equipment is in operation;
   an electromagnetic acoustic transducer (EMAT) coupled to the proximal end of the elongated bolt, the transducer being adapted to:
      generate a sound wave within the proximal end of the elongated bolt, detect an echo of the sound wave reflected by the distal end of the elongated bolt, and report to a controller a time delay between the generation of the sound wave and the detection of the echo;

wherein the time delay between the generation of the sound wave and the detection of the echo represents a residual length of the elongated bolt.

2. The device of claim 1, wherein the transducer is near the proximal end of the elongated bolt without being in solid contact with the proximal end of the elongated bolt.

3. The device of claim 1, wherein the residual length of the elongated bolt is usable to evaluate the wear of the wearable device.

4. The device of claim 1, wherein the length of the shank matches the height of the wearable device in the absence of wear on the wearable device.

5. The device of claim 1, wherein the elongated bolt further comprises a shoulder at a junction of the threaded section and of the shank, the shoulder being configured to prevent a relative movement between the elongated bolt and the wearable device.

6. The device of claim 1, wherein the elongated bolt is made of steel.

7. The device of claim 1, wherein the device is adapted for monitoring wear of a steel wearable device, a rubber wearable device or a hybrid wearable device.

8. A system for monitoring wear of a plurality of wearable devices mounted in a mining equipment, comprising:
a plurality of devices as defined in claim 1, one of more of the plurality of devices maintaining one of the plurality lifters wearable devices in place on the face of the mining equipment;
a controller operatively connected to the transducer of each of the plurality of devices, the controller being configured to:
receive a given time delay from any given device among the plurality of devices;
determine a residual length of the elongated bolt of the given device based on the given time delay; and
evaluate a wear of a given wearable device maintained in place on the face of the mining equipment by the given device based on the residual length of the given elongated bolt.

9. The system of claim 8, wherein:
the transducer of each of the plurality of devices is further adapted to provide an electronic identification to the controller; and
the controller is further configured to identify each of the plurality of devices based on the provided electronic identification.

10. The system of claim 8, wherein:
two or more devices are used to evaluate the wear on a given one of the plurality wearable devices; and
the controller is further configured to evaluate a gradient of wear on the given one of the plurality of wearable devices based on positions of the two or more devices on the given one of the plurality of wearable devices.

11. The system of claim 8, wherein the plurality of devices is used to evaluate the wear of a subset of the plurality of wearable devices.

12. The system of claim 8, wherein:
the plurality of wearable devices include a first plurality of wearable devices having a first height and a second plurality of wearable devices having second height greater than the first height;
the plurality of devices include one or more first devices, each of the one or more first devices including a first elongated bolt maintaining one of the first plurality wearable devices in place on the face of the mining equipment, the shank of the first elongated bolt being dimensioned for extending along the first height, each of the one or more first devices being adapted to report a respective first time delay to the controller;
the plurality of devices include one or more second devices, each of the one or more second devices including a second elongated bolt maintaining one of the second plurality wearable devices in place on the face of the mining equipment, the shank of the second elongated bolt being dimensioned for extending along the second height, each of the one or more second devices being adapted to report a respective second time delay to the controller;
the controller is further configured to derive a wear profile for the plurality of wearable devices based on the first and second time delays.

13. The system of claim 8, wherein the mining equipment comprises a rotating drum and wherein the face of the mining equipment is a face of the rotating drum, the system further comprising:
a battery adapted to be mounted on the rotating drum and to supply electric power to the controller and to each of the plurality of devices;
a generator adapted to be mounted on the rotating drum, the generator comprising a pendulum and a charger, a movement of the pendulum causing the charger to generate electric power to charge the battery when the rotating drum rotates; and
a wireless communication interface operatively connected to the controller and adapted to transmit information about the wear of one or more of the plurality of wearable devices to an external server.

14. The system of claim 8, further comprising a communication interface operatively connected to the controller and adapted to transmit information about the wear of one or more of the plurality of wearable devices to an external server.

15. The system of claim 8, wherein the controller is further configured to monitor the wear of the one or more of the plurality of wearable devices in real time.

16. The system of claim 8, wherein the controller is further configured to evaluate a rate of wear of one or more of the plurality of wearable devices.

17. A method of assembling the device of claim 1 on a mining equipment, comprising:
mounting the elongated bolt to the wearable device;
mounting the wearable device on the mining equipment by inserting the threaded section of the elongated bolt through the hole on the face of the mining equipment;
tightening the nut on the threaded section of the elongated bolt protruding externally from the mining equipment; and
after tightening of the nut, attaching the transducer on the proximal end of the elongated bolt.

18. The method of claim 17, wherein mounting the elongated bolt to the wearable device comprises inserting the elongated bolt from a top of a perforation extending along the height of the wearable device, a location of the perforation being selected to match the hole on the face of the mining equipment where the threaded section of the elongated bolt will be inserted when the wearable device is maintained in place on the face of the mining equipment.

19. The method of claim 17, wherein:
the wearable device is a rubber or a hybrid wearable device; and mounting the elongated bolt to the rubber or hybrid wearable device comprises:
  positioning the elongated bolt so that the threaded section will be inserted in the hole of the face of the mining equipment when the wearable device is maintained in place on the face of the mining equipment, and
  vulcanizing the shank of the elongated bolt within the wearable device.

20. The device of claim 1, wherein:
the mining equipment is a mineral crusher; and
the wearable device is a lifter mounted on an internal face of the mineral crusher.

\* \* \* \* \*